United States Patent
Patidar et al.

(10) Patent No.: US 11,102,125 B2
(45) Date of Patent: Aug. 24, 2021

(54) SECURING COMMUNICATIONS BETWEEN SERVICES IN A CLUSTER USING LOAD BALANCING SYSTEMS AND METHODS

(71) Applicant: Citrix Systems, Inc., Fort Lauderdale, FL (US)

(72) Inventors: Mehul Patidar, Bengaluru (IN); Swetha Garipally, Bengaluru (IN); Nilamadhava Chaudhury, Bengaluru (IN); Subrata Sarkar, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 133 days.

(21) Appl. No.: 16/454,396

(22) Filed: Jun. 27, 2019

(65) Prior Publication Data
US 2020/0412651 A1   Dec. 31, 2020

(51) Int. Cl.
*H04J 3/16* (2006.01)
*H04L 12/803* (2013.01)
*H04L 29/06* (2006.01)

(52) U.S. Cl.
CPC ........ *H04L 47/125* (2013.01); *H04L 63/0281* (2013.01); *H04L 63/0428* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 2006/0053290 A1* | 3/2006 | Randle | G06Q 20/388 713/169 |
| 2011/0289508 A1 | 11/2011 | Fell et al. | |
| 2014/0157042 A1 | 6/2014 | Johnson et al. | |
| 2020/0137185 A1* | 4/2020 | Parekh | H04L 67/28 |
| 2020/0236088 A1* | 7/2020 | Karkkainen | H04W 12/06 |

OTHER PUBLICATIONS

International Search Report and Written Opinion on PCT Appl. No. PCT/US2020/039140 dated Sep. 22, 2020.
Netto Hylson Vescovi, et al., "Koordinator a Service Approach for Replicating Docker Containers in Kubernetes", 2018 IEEE Symposium on Computers an Communications (ISCC), IEEE, Jun. 25, 2018 (Jun. 25, 2018), pp. 58-63, XP033448514.

* cited by examiner

*Primary Examiner* — Kwang B Yao
*Assistant Examiner* — Juvena W Loo
(74) *Attorney, Agent, or Firm* — Foley & Lardner LLP

(57) ABSTRACT

Described embodiments provide systems and methods for securing communications between services in a cluster using load balancing. A first proxy of a first node of a cluster of nodes can receive a request for a service from at least one pod of the first node. The service can include a plurality of pods. The plurality of pods can execute in the cluster of nodes including the first node. The first proxy can select, responsive to a load balancing determination, a pod of a second node of the cluster of nodes to receive the request. An encrypted connection can be established with a second proxy of the second node. The request can be forwarded to the selected pod via the encrypted connection to the second proxy. The request can be decrypted at the second proxy and forwarded at the pod of the second node.

20 Claims, 5 Drawing Sheets

SECURING COMMUNICATIONS BETWEEN SERVICES IN A CLUSTER USING LOAD BALANCING SYSTEMS AND METHODS

BACKGROUND

In network environments, computers can be assigned a unique identifier corresponding to an internet protocol (IP) address. For example, a computer or other form of network device can be assigned an IPv4 address or an IPv6 address. As the internet transitions from using IPv4 addresses to instead using IPv6 addresses, more and more computers and other forms of network devices can be assigned an IPv6 address to uniquely identify the respective computer or network device.

SUMMARY

Systems and method for securing communications between services in a cluster are provided herein. In embodiments, proxies can be deployed at each node in the cluster to provide secure communication for traffic intended for an IP address of a service and traffic intended for an IP address of one or more pods associated with the service and executing on a local node, local to the respective proxy. The proxies deployed at each node can provide secure communication for outbound traffic generated by one or more pods executing at the local node and inbound traffic intended for one or more pods executing at the local node. For example, the proxies can establish encrypted connections between proxies at remote nodes. The proxies can encrypt traffic or requests before forwarding the traffic to a proxy at a remote node. The remote proxy receiving the encrypted traffic can decrypt the traffic and provide it to at least one pod executing on the remote node in an original format that the traffic was provided to the local proxy. In some embodiments, the proxies can reduce traffic for one or more connections between the proxies. For example, the proxies can compress the traffic between nodes to reduce or otherwise optimize bandwidth utilization. The local node proxy can perform health monitoring for the local node and the pods executing on the local node to reduce a health monitoring burden on the pods executing on the local node.

In at least one aspect, this disclosure is directed to a method for securing communications between services in a cluster using load balancing. The method can include receiving, by a first proxy of a first node of a cluster of nodes, a request for a service from at least one pod of the first node. The service can include a plurality of pods. The plurality of pods can execute in the cluster of nodes including the first node. The method can include selecting, by the first proxy responsive to a load balancing determination, a pod of a second node of the cluster of nodes to receive the request. The method can include establishing, by the first proxy, an encrypted connection with a second proxy of the second node. The method can include forwarding, by the first proxy, the request to the selected pod via the encrypted connection to the second proxy. The request can be decrypted at the second proxy and forwarded at the pod of the second node.

In embodiments, the method can include generating at least one proxy for each node of the cluster of nodes to perform and providing the at least one proxy to each node of the cluster of nodes. The method can include generating a first load balancer for the first proxy of the first node to perform service level load balancing for outbound traffic from the first node and pod level load balancing for inbound traffic intended for pods executing on the first proxy. The method can include generating a second load balancer for the second proxy of the second node to perform service level load balancing for outbound traffic from the second node and pod level load balancing for inbound traffic intended for pods executing on the second proxy. The method can include receiving, by the first proxy, a plurality of requests for one or more services from a plurality of pods executing on the first node, the requests received in a first format and modifying, by the first proxy, the plurality of requests from the first format to a second format to encrypt each request of the plurality of requests for transmission through the encrypted connection. The request can include an IP address of the service.

In embodiments, the method can include identifying, by the first proxy using a load balancer. Each pod can be associated with the service and a node hosting the identified pods. The method can include determining, by the first proxy using the load balancer, a host node for each pod associated with the service. The method can include decrypting, by the second proxy, the request received from the first proxy to an original format. The original format can correspond to a format of the request when the request was received at the first proxy. The method can include transmitting, by the second proxy, a decrypted request to the pod of the second node. The method can include identifying, by the first proxy, a plurality of pods associated with the service and a node hosting the identified pods and grouping, by the first proxy, the plurality of pods into multiple groups based on the node hosting the identified pods of the plurality of pods. The method can include grouping, by the first proxy using a load balancer, one or more pods associated with the service and executing on the first node into a local group. The local group can be provided as a first backend server with a first protocol for the load balancer. The method can include grouping, by the first proxy using the load balancer, one or more pods associated with the service and executing on the second node into a remote group. The remote group can be provided as a second backend server with a second protocol for the load balancer, the first protocol different from the second protocol.

In at least one aspect, a system for securing communications between services in a cluster using load balancing is provided. The system can include a first proxy of a first node comprising one or more processors, coupled to a memory. The first proxy can be configured to receive a request for a service from at least one pod of the first node. The service can include a plurality of pods. The plurality of pods can execute in a cluster of nodes including the first node. The first proxy can be configured to select, responsive to a load balancing determination, a pod of a second node of the cluster of nodes to receive the request. The first proxy can be configured to establish an encrypted connection with a second proxy of the second node. The first proxy can be configured to forward the request to the selected pod via the encrypted connection to the second proxy. The request can be decrypted at the second proxy and forwarded at the pod of the second node.

In embodiments, the first proxy can be configured to generate at least one proxy for each node of the cluster of nodes to perform and provide the at least one proxy to each node of the cluster of nodes. The first proxy can be configured to generate a first load balancer for the first proxy of the first node to perform service level load balancing for outbound traffic from the first node and pod level load balancing for inbound traffic intended for pods executing on the first proxy. The first proxy can be configured to generate a second load balancer for the second proxy of the second node to perform service level load balancing for outbound traffic from the second node and pod level load balancing for inbound traffic intended for pods executing on the second proxy. The first proxy can be configured to receive a plurality of requests for one or more services from a plurality of pods executing on the first node. The plurality of requests can be received in a first format. The first proxy can be configured to modify the plurality of requests from the first format to a second format to encrypt each request of the plurality of requests for transmission through the encrypted connection. The request can include an IP address of the service.

In embodiments, the first proxy can be configured to identify, using a load balancer, each pod associated with the service and a node hosting the identified pods and determine, using the load balancer, a host node for each pod associated with the service. The second proxy can be configured to decrypt the request received from the first proxy to an original format. The original format can correspond to a format of the request when the request was received at the first proxy. The second proxy can be configured to transmit a decrypted request to the pod of the second node. The first proxy can be configured to identify a plurality of pods associated with the service and a node hosting the identified pods and group the plurality of pods into multiple groups based on the node hosting the identified pods of the plurality of pods. The first proxy can be configured to group, using a load balancer, one or more pods associated with the service and executing on the first node into a local group. The local group can be provided as a first backend server with a first protocol for the load balancer. The first proxy can be configured to group, using the load balancer, one or more pods associated with the service and executing on the second node into a remote group. The remote group can be provided as a second backend server with a second protocol for the load balancer. The first protocol can be different from the second protocol.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes methods and systems for securing communications between services in a cluster.

A. Computing Environment

Prior to discussing the specifics of embodiments of the systems and methods of < >, it may be helpful to discuss the computing environments in which such embodiments may be deployed.

Figure 1:
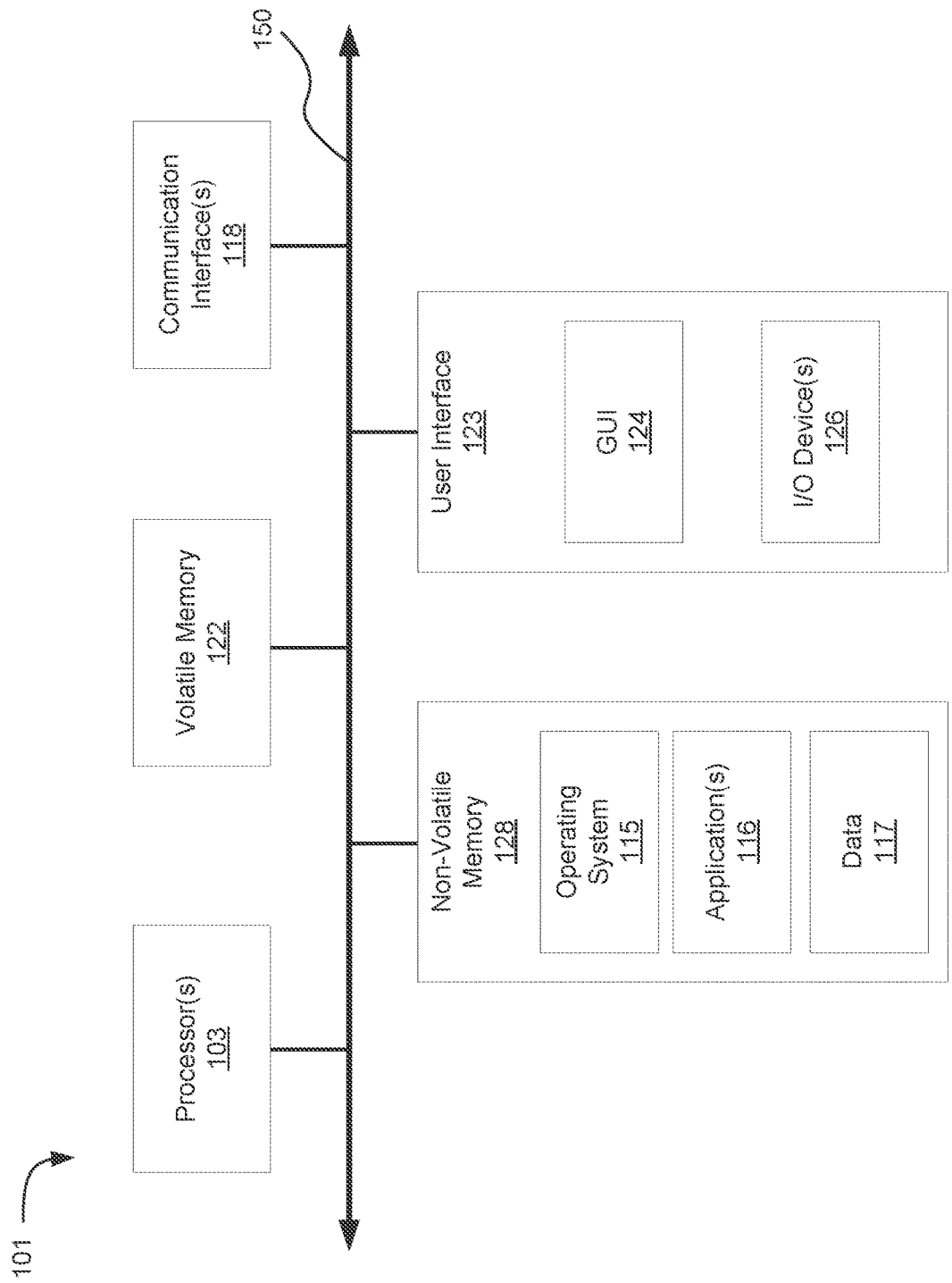
FIG. 1 is a block diagram of embodiments of a computing device.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

B. Securing Communications between Services in a Cluster

Systems and method for securing communications between services in a cluster are provided herein. In embodiments, a proxy can be provided to and deployed at each node of a cluster, such as a kubernetes cluster. Each node can include or host one or more pods with the pods corresponding to one or more services. In embodiments, all traffic received at and transmitted from a node can be routed through the respective proxy deployed at the node to provide secured communication between the different nodes and thus between the different services of the cluster. The proxies can perform load balancing at the respective node the proxies are deployed at. For example, the proxies can load balance service to service traffic generated from pods executing on a local node that the respective proxy is deployed at to determine and select one or more pods at a remote node to receive the generated traffic (e.g., requests).

In a cluster environment, such as a kubernetes environment, a proxy can be deployed in two modes: per-node mode and per-pod mode. In per-pod mode proxy deployment, a proxy can be deployed at or attached to each of the pods running in the kubernetes environment. The proxy can run alongside the respective pod to capture all of the incoming and outgoing traffic of the respective pod. For example, the proxies can establish encrypted connections between other proxies executing at other pods to provide security. Thus, the proxies can provide secured communication for the respective pods. However, per-pod proxy can utilize large shares of system resources as compared to per-node proxy deployment. In per-node mode, a network proxy can be deployed at each node. However, the role of the proxy at each node is to load balance service to service traffic generated from the respective pods executing on the local node, local to the respective proxy. Thus, the proxies manage outbound traffic and do not provide secured communication between services or for inbound traffic. Systems and methods provided herein describe using a node proxy in service to service communication or a microservice orchestration system to provide secured communication between services by shielding service instances using hierarchical load balancing (LB).

In embodiments, the proxies can be deployed at the nodes to provide hierarchical load balancing to capture both inbound and outbound traffic for a secured service. For example, the proxies can include a load balancer to provide service level load balancing to capture and route outbound traffic generated by pods at the local node hosting the respective proxy. The proxies can include a load balancer to provide pod level load balancing to capture inbound traffic intended for pods at the local node hosting the respective proxy.

In embodiments, when a new secured service is deployed on a cluster, a load balancer with the respective services IP address (e.g., ClusterIP) can be created and deployed at each of the proxies in the cluster. The load balancer can perform service level load balancing for the proxy the load balancer is provided to. The proxies can divide or partition the pods for a service (e.g., end point pods) into multiple groups. For example, the proxies can divide or partition the pods for the service into a local group and a remote group. The local group can include pods running or executing on a local node (e.g., local to the node the respective proxy is executing on) and the remote group can include pods running or executing on one or more remote pods (e.g., remote to the node the respective proxy is executing on). The local group can be added as a backend server for the service level load balancing with a first protocol, including but not limited to HTTP or TCP. The remote group can be added as a back server for the load balancing with a second protocol, including but not limited to, SSL protocol.

In embodiments, when a pod of a secured service is deployed on a node, at least one pod level load balancer of SSL type can be created with static virtual IP address (e.g., local node proxy IP) and a unique port number on the local nodes proxy and the pod can be added as a backend server for the load balancing. The proxy for the local node can configure one or more IP tables of the local node to forward traffic for that pod to the corresponding pod level load balancer. In embodiments, as all of the inbound and outbound traffic for a secured service can be routed through a proxy at the local nodes, the proxies can provide secured communication. In some embodiments, the proxies can provide compression for pod level load balancing to reduce traffic between the nodes and this, reducing bandwidth utilization.

In some embodiments, at least one pod executing on a local node can generate a request for a service in a first format. The request can be received by a proxy executing on the local node. A load balancer for the service and deployed at the local node proxy can determine the pods associated with the service and the nodes (e.g., local node, remote nodes) hosting the pods. The load balancer can select at least one pod, such as a pod executing on a remote node to receive the request for the service. The local proxy can establish an encrypted connection to a proxy executing at the remote node. The local proxy can encrypt the request and forward to the request to the remote proxy through the encrypted connection. The remote proxy can decrypt the request and forward the decrypted request to the selected pod in the first format. Thus, the pod associate with the service and executing on the remote node can receive the request in the same format as the format the request was generated in and forwarded to the local pod. Thus, traffic can be transmitted between the nodes using secure communications.

Figure 2:
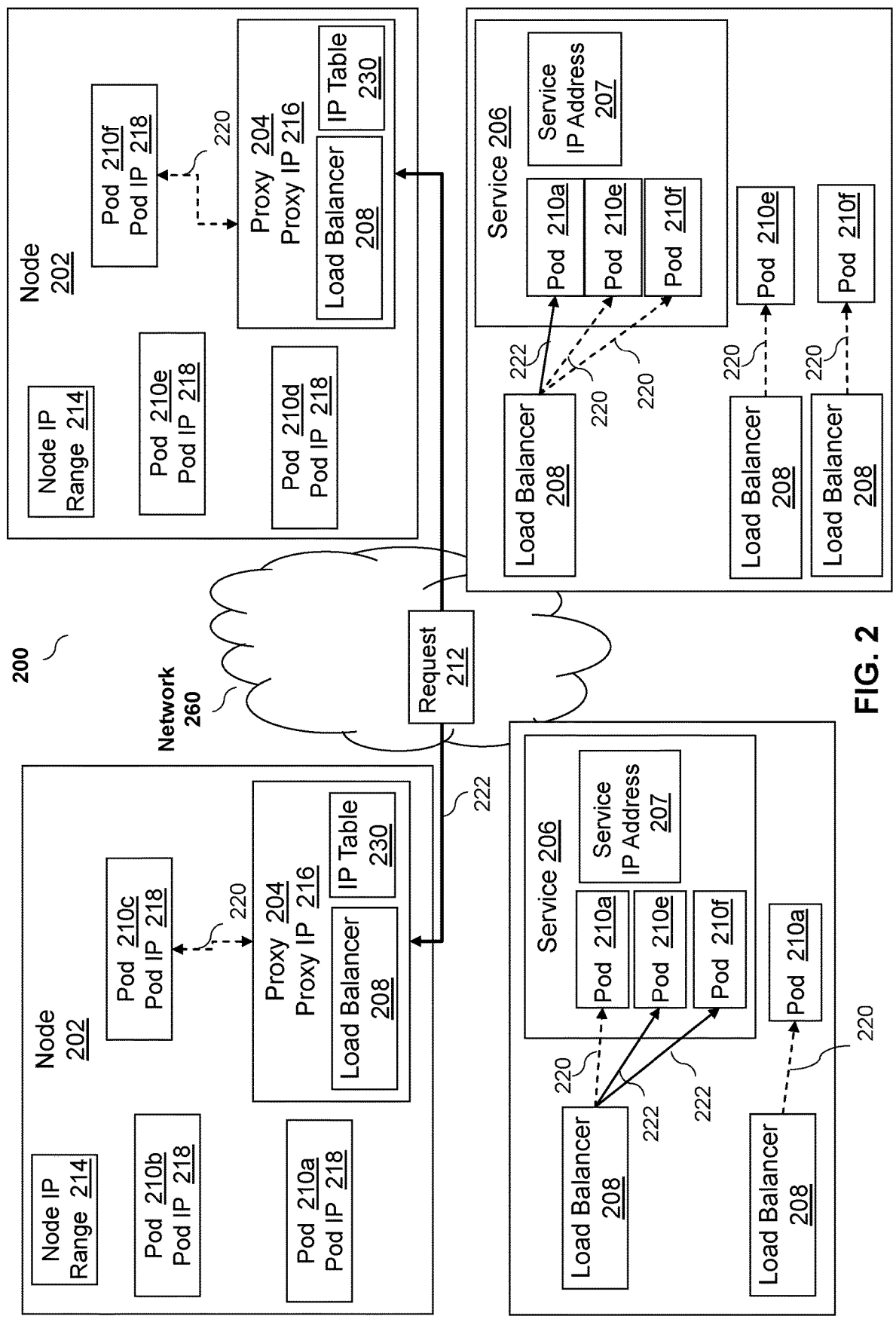
FIG. 2 is a block diagram of a system for securing communications between services in a cluster.

Referring to FIG. 2, depicted is a block diagram of one embodiment of a cluster environment 200 having a cluster of nodes 202. The nodes 202 can include one or more pods 210. The pods 210 can be grouped or associated with one or more services 206 of the cluster environment 200. For example, a service 206 can include a set or group of pods 210 that work together to provide the functionality or a portion of the functionality of the respective service 206.

Nodes 202 can execute or run a service 206 to perform various tasks for the cluster environment 200. In embodiments, the nodes 202 can include or be a machine (e.g., virtual machines) where containers (e.g., workloads) are deployed and execute or run containerized applications and other workloads. In embodiments, the containers can reside or be included within a pod 210. The nodes 202 can include one or more pods 210. The pods 210 running on a common node 202 can be associated with the same service 206. In embodiments, the pods 210 running on a common node 202 can be associated with one or more different service 206. For example, and referring to FIG. 2, pod 210a of a first node 202 and pods 210e, 210f of a second node 202 can be associated with a first service 206 and execute on different nodes 202, here first and second nodes 202. The nodes 202 can include a single pod 210. The nodes 202 can include two or more pods 210. In some embodiments, one node 202 of the cluster of nodes 202 can act as or be assigned as a master node 202 and the remaining nodes 202 of the cluster environment 200 can be slave nodes. The master node 22 can manage or control the slave nodes 202. In embodiments, the master node 202 can receive updates, status reports, or health reports from each of the slave nodes 202.

The nodes 202 can include or be assigned a range of IP addresses, also referred to as a node IP range 214. The node IP range 214 can include or correspond to the IP address of the proxy 204 executing on the respective node 202 and IP addresses of the pods 210 executing the respective node 202. For example, the node IP range 214 can include an IP address range that includes the IP address of the proxy 204 executing on the respective node 202 and IP addresses of each of the pods 210 executing the respective node 202. In some embodiments, each of the nodes 202 can be assigned a unique IP address, also referred to as a node IP address.

In some embodiments, the nodes 202 can include one or more processors coupled to a memory. The one or more processors can include or be coupled to a non-volatile memory that stores computer instructions and an operating system. For example, the computer instructions can be executed by the one or more processors out of volatile memory to perform all or part of the method 300. The nodes 202 can be implemented using hardware or a combination of software and hardware. For example, each component of the nodes 202 can include logical circuitry (e.g., a central processing unit or CPU) that responses to and processes instructions fetched from a memory unit (e.g., memory). Each component of the nodes 202 can include or use a microprocessor or a multi-core processor. A multi-core processor can include two or more processing units on a single computing component. Each component of the nodes 202 can be based on any of these processors, or any other processor capable of operating as described herein. Each processor can utilize instruction level parallelism, thread level parallelism, different levels of cache, etc. For example, the nodes 202 can include at least one logic device such as a computing device or server having at least one processor to communicate via a network 260. The components and elements of the nodes 202 can be separate components or a single component. For example, the nodes 202 can include combinations of hardware and software, such as one or more processors configured to initiate stop commands, initiate motion commands, and transmit or receive event data, for example. The nodes 202 can include a structured set of data. For example, the nodes 202 can include and/or store a plurality of metadata corresponding to one or more pods 210, one or more requests 212, one or more proxies 204, and/or one or more services 206. The nodes 202 can include a memory component (e.g., memory) to store and retrieve data. The memory can include a random access memory (RAM) or other dynamic storage device, coupled with the nodes 202 for storing information, and instructions to be executed by the nodes 202. The memory can include at least one read only memory (ROM) or other static storage device coupled with the nodes 202 for storing static information and instructions for the nodes 202. The memory can include a storage device, such as a solid state device, magnetic disk or optical disk, coupled with the nodes 202 to persistently store information and instructions.

A proxy 204 can be created for each node 202 of the cluster environment 200. Each of the proxies 204 can be assigned a unique internet protocol (IP) address, also referred to as a proxy IP address 216. The proxy 204 can include or correspond to a gateway to monitor, manage and route traffic, including requests 212, within the cluster 200 can between the nodes 202 and/or pods 210. The proxy 204 can perform or provide load balancing the node 202 the respective proxy 204 is executing at and/or for the cluster environment 200. The proxy 204 can be a gateway between the respective node 202 is at executing at and other nodes 202 in the cluster environment 200 and/or pods 210 in the cluster environment 200. For example, the proxy 204 can manage and control all outbound traffic from the node 202 the respective proxy 204 is at executing at. In embodiments, outbound traffic can include traffic (e.g., requests) generated by one or more pods 210 executing on the same node 202 as the respective proxy 204 and intended for other nodes 202 in the cluster environment 200 and/or pods 210 in the cluster environment 200. The proxy 204 can manage and control all inbound traffic received at the node 202 the respective proxy 204 is at executing at and/or one or more pods 210 executing on the same node 202 as the respective proxy 204. In embodiments, inbound traffic can include traffic (e.g., requests) intended for one or more pods 210 executing on the same node 202 as the respective proxy 204 and generated by other nodes 202 in the cluster environment 200 and/or other pods 210 in the cluster environment 200. In embodiments, the proxy 204 can include a firewall or a filter to selectively control access to the node 202 or pods 210 executing on the node 202. For example, the proxy 204 can include a firewall or a filter to determine whether to forward a request 212 for a pod 210 to the respective pod responsive to applying the firewall policies (e.g., security policies) or filter to the request 212. In some embodiments, the proxy 204 can run or implement a form of virtual IP for one or more services 206 associated with the node 202 the respective proxy 204 is executing at.

The proxy 204 can be configured to establish an encrypted connection 222 between at least one proxy 204 at a different node 202. The proxy 204 can be configured to establish an encrypted connection 222 to each proxy 204 deployed at each of the nodes 202 of the cluster environment 200. The encrypted connection 222 can include encrypted and/or secure sessions established between the proxies 204 and/or nodes 202. In embodiments, the proxy 204 can control and manage an encryption level and/or encryption type applied to the traffic (e.g., data requests 212), level of interactivity allowed for node 202, pod 210 or service 206, limited access to certain features of a pod 210, node 202 or service 206, restrictions to use or transfer of data obtained from a pod 210, node 202 or service 206, limit concurrent access to two or more pods 210, nodes 202 or services 206, limit access to certain file repositories or other resources, and so on in cluster 200.

The encrypted connection 222 can include a connection that is encrypted using one or more security protocols to protect the traffic (e.g., data, requests 212) transmitted through the respective connection. For example, in some embodiments, the proxy 204 can encrypt the traffic (e.g., data, requests 212) transmitted through the connection prior to transmitting the traffic (e.g., data, requests 212) transmitted through the connection. The traffic can be encrypted using encryption codes, encryption keys, encryption algorithms or a combination of one or more of encryption codes, encryption keys, and encryption algorithms. In some embodiments, the proxy 204 can generate encryption codes or encryption keys for the encrypted connection 222. In embodiments, the nodes 202 can generate encryption codes or encryption keys for the encrypted connection 222.

In embodiments, all traffic (e.g., data requests 212) transmitted through the encrypted connections 222 described herein can be encrypted. The proxy 204 can be configured to encrypt one or more requests 212 received from one or more pods 210. For example, the proxy 204 can encrypt a request 212 received from a pod 210 executing on the same node 202 (e.g., local node 202) as the respective proxy 204. The proxy 204 can encrypt the requests 212 generated by pods 210 executing on the local node 202 for transmission or forwarding to nodes 202 executing on remote nodes 202 through the encrypted connection 222 via a remote proxy 204 executing on the remote node 202.

In some embodiments, an encryption code or encryption key can be generated by the proxy 204 to encrypt the request 212. The encryption code or encryption key can be generated using a passphrase or biometric data supplied by a user, administrator, or a node 202. In some embodiments, the encryption code or encryption key can be XORed with another encryption code or encryption key randomly generated and stored on a node 202 or in the proxy 204.

The proxy 204 can be configured to decrypt one or more requests 212 received from a remote proxy or one or more remote pods 210. The proxy 204 can decrypt the encrypted requests 212 using an encryption code, encryption key or encryption algorithm that was used to encrypt the request 212. The proxy 204 can decrypt a request 212 received from a proxy executing on a different node 202 (e.g., remote node 202) as the proxy 204 receiving the encrypted request 212 or from a pod 210 executing on a different node 202 as the proxy 204 receiving the encrypted request 212. The proxy 204 can decrypt encrypted requests 212 intended for one or more pods 210 executing on the local node 202 and received through the encrypted connection 222 via a remote proxy 204 executing on a remote node 202. The proxy 204 can route and manage requests 212 of one or more protocols. For example, the proxy 204 can route and manage requests 212 of protocols, including but not limited to, HyperText Transfer Protocol (HTTP), Transmission Control Protocol (TCP) and/or Secure Sockets Layer (SSL) protocol.

A load balancer 208 can created for and deployed at each proxy 204 of each node 202. The load balancer 208 can be created for a particular service 206. For example, the load balancer 208 can be created or deployed to manage requests 212 for a particular service 206. The load balancer 208 can load balance the requests 212 to select at least one pod 210 of a plurality of pods 210 associated with the service 206 to receive and/or handle the request 212. In some embodiments, multiple load balancers 208 can be deployed at one or more proxies 204 of one or more nodes 202 of the cluster environment 200. For example, at least one load balancer 208 can be deployed at one or more proxies 204 of one or more nodes 202 of the cluster environment 200 for each service 206 of the cluster environment 200.

The load balancer 208 can perform load balancing for the respective node 202. In some embodiments, a load balancer 208 can be generated for a particular service 206 can manage and load balance requests 212 for the service 206. The load balancer 208 can perform various types of load balancing to select at least one pod 210 of a service 206 to receive or handle a request 212. For example, the load balancer 208 can load balance requests 212 for the service 206 the respective load balancer 208 is associated with or created for. The load balancer 208 can execute a load balancing algorithm or scheduling algorithm to perform load balancing, including but not limited to, round robin load balancing, weighted round robin load balancing, least connection load balancing, hierarchical load balancing, random load balancing, service level load balancing, or pod level load balancing. The load balancer 208 can execute a load balancing algorithm or scheduling algorithm to select a pod 210 of a service 206 to receive and/or handle a request 212.

In some embodiments, the load balancer 208 can perform compression on network traffic (e.g., data, requests 212). The load balancer 208 can provide compression for pod level load balancing to reduce traffic between the nodes 202 and reduce bandwidth utilization. The load balancer 208 can receive a request 212 and determine if an intended pod 210 or a proxy 204 executing on the node 202 hosting the intended pod 210 can accept compressed content, including requests 212. Responsive to the determination, the load balancer 208 can compress the request 212 or the encrypted request 212 can transmit the compressed request 212 or compressed encrypted request 212 to the intended pod 210 or the proxy 204 executing on the node 202 hosting the intended pod 210. In some embodiments, the load balancer 208 can perform compression on traffic, including requests 212, to reduce a size of number of bits representing the respective traffic, including requests 212 as compared to an original or initial version of the traffic or request 212.

In embodiments, the proxy 204 for a local node 202 can configure one or more IP tables 230 of the local node 202 to forward traffic (e.g., requests 212) for one or more pods 210 of the local node 202 to a corresponding pod level load balancer 208. In some embodiments, the load balancer 208 can use the IP table 230 to identify pods 210 of a service 206 and/or select a pod 210 to receive or handle a request 212. The IP table 230 can include a database. The IP table 230 can include a plurality of entries. The IP table 230 can be arranged by service 206, by node 202, by pod 210 or by any combination of service 206, by node 202 and by pod 210. In some embodiments, the IP table can include one or more service IP addresses 207, one or more node IP ranges 214, one or more proxy IP addresses 216, and/or one or more pod IP addresses 218. The IP table 230 can include or correspond to a memory. The memory can be implemented using hardware or a combination of software and hardware. For example, each component of the IP table 230 can include logical circuitry (e.g., a central processing unit or CPU) that responses to and processes instructions fetched from a memory unit or database. Each component of the IP table 230 can include or use a microprocessor or a multi-core processor. A multi-core processor can include two or more processing units on a single computing component. Each component of the IP table 230 can be based on any of these processors, or any other processor capable of operating as described herein. Each processor can utilize instruction level parallelism, thread level parallelism, different levels of cache, etc. For example, the IP table 230 can include at least one logic device such as a computing device or server having at least one processor to communicate via a network 260. The components and elements of the IP table 230 can be separate components or a single component. For example, the IP table 230 can include combinations of hardware and software, such as one or more processors configured to initiate stop commands, initiate motion commands, and transmit or receive timing data, for example. The IP table 230 can include a structured set of data. The IP table 230 can include a random access memory (RAM) or other dynamic storage device, coupled with the processor for storing information, and instructions to be executed by the service 206, node 202 or proxy 204. The IP table 230 can include at least one read only memory (ROM) or other static storage device coupled with the processor for storing static information and instructions for the service 206, node 202 or proxy 204. The IP table 230 can include a storage device, such as a solid state device, magnetic disk or optical disk, coupled with the processor to persistently store information and instructions.

One or more pods 210 can be deployed at or executing at the nodes 202 of the cluster environment 200. The pods 210 can be associated with or a component of at least one service 206. For example, the services 206 (e.g., kubernetes services) can include, be made of or define a set or group of pods 210. In some embodiments, the pods 210 can be referred to as end point pods 210 for a service 206. The pods 210 can include a scheduling unit. A pod 210 can include one or more containers that can be deployed at a node 202 and share resources of other pods 210 of the cluster environment 200. The pods 210 running on a common node 202 can be associated with the same service 206. In embodiments, the pods 210 running on a common node 202 can be associated with one or more different service 206. For example, and referring to FIG. 2, pod 210a of a first node 202 and pods 210e, 210f of a second node 202 can be associated with a first service 206 and execute on different nodes 202, here first and second nodes 202. The nodes 202 can include a single pod 210. Each of the pods 210 can be assigned a unique IP address, also referred to as a pod IP address 218.

The pods 210 can be grouped based in part on a service 206 the respective pod 210 is associated with. For example, in some embodiments, a first pod 210a, fifth pod 210e, and a sixth pod 210f can be generated for, assigned to or associated with a service 206. The first pod 210a can be executing on the first node 202 and the fifth pod 210e and the sixth pod 210f can be executing on the second node 202. Thus, the service 206 can include pods 210 on the first and second nodes 202. The first, second and third pods 210a, 210b, 210c can communication with the first proxy 204 of the first node 202 through a connection 220. The connection 220 can be an unencrypted connection. For example, as the first, second and third pods 210a, 210b, 210c are executing on same, local first node 202 as the first proxy 204, the first, second and third pods 210a, 210b, 210c can communicate and transmit unencrypted requests 212 in a first format (e.g., unencrypted format) with the first proxy 204. The first proxy 204 can communicate with the fourth, fifth, and sixth pods 210d, 210e, 210f of the second node 202 through an encrypted connection 222 established between the first proxy 204 and the second proxy 204. The fourth, fifth, and sixth pods 210d, 210e, 210f can communication with the second proxy 204 of the second node 202 through a connection 220. The connection 220 can be an unencrypted connection. For example, as the fourth, fifth, and sixth pods 210d, 210e, 210f are executing on same, local second node 202 as the second proxy 204, the fourth, fifth, and sixth pods 210d, 210e, 210f can communicate and transmit unencrypted requests 212 in a first format (e.g., unencrypted format) with the second proxy 204. The second proxy 204 can communicate with the first, second, and third pods 210a, 210b, 210c of the first node 202 through an encrypted connection 222 established between the first proxy 204 and the second proxy 204.

The proxies 204 can divide or partition the pods 210 for a service 206 (e.g., end point pods) into multiple groups. For example, the proxies 204 can divide or partition the pods 210 for the service 206 into a local group and a remote group. The local group can include pods 210 running or executing on a local node 202 (e.g., local to the node 202 the respective proxy 204 is executing on) and the remote group can include pods 210 running or executing on one or more remote pods 210 (e.g., remote to the node 202 the respective proxy 204 is executing on). The local group of pods 210 can be added as or form a backend server for the service level load balancing with a first protocol, including but not limited to HTTP or TCP. The remote group of pods 210 can be added as or form a back server for the load balancing with a second protocol, including but not limited to, SSL protocol.

The pods 210 can be deployed at a node 202 for a new secured service 206 or existing secured service 206. For example, when a pod 210 of a secured service 206 is deployed on a node 202, at least one pod level load balancer 28 of SSL type can be created with static virtual IP address (e.g., local node proxy IP, proxy IP address 216) and a unique port number on the local nodes proxy 204 and the pod 210 can be added as a backend server for the load balancing.

The pods 210 can generate requests 212 for a service 206 of the cluster environment 200. For example, a pod 210 can generate a request 212 for a service 206 of the cluster environment 200 that can be forwarded to or transmitted to at least one other pod 210 associated with the respective service 206 to receive or handle the respective request 212. The pods 210 can generate the requests 212 in one or more protocols. For example, the pods 210 can generate the requests 212 in HTTP, TCP or SSL protocol.

A service 206 can be a group or set of pods 210 executing or running in the cluster environment 200. The service 206 can include pods 210 executing on a common or same node 202. The service 206 can include pods 210 executing on two or more nodes 202. In embodiments, the services 206 can provide a microservice architecture within the cluster environment 200. The services 206 can be assigned a unique IP address, referred to as a service IP address 207 or cluster IP 207. In some embodiments, the service 206 can include a processor. The processor can include non-volatile memory that stores computer instructions and an operating system. For example, the computer instructions can be executed by the processor out of volatile memory to perform all or part of the method 300. The processor can include or execute policies or rules for the service 206.

Network 260 may be a public network, such as a wide area network (WAN) or the Internet. In some embodiments, network 260 may be a private network such as a local area network (LAN) or a company Intranet. Network 260 may be a public network, such as a wide area network (WAN) or the Internet. Network 260 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, each of the nodes 202 may be on the same network 260. In some embodiments, a node 202 can be on a different network 260 from one or more other nodes 202. The network 260 can include a virtual private network (VPN). The VPN can include one or more encrypted connections 222 from a first node 202 to a second, different node 202 over network 260 (e.g., internet, corporate network, private network).

Each of the above-mentioned elements or entities is implemented in hardware, or a combination of hardware and software, in one or more embodiments. Each component of the nodes 202 may be implemented using hardware or a combination of hardware or software detailed above in connection with FIG. 1. For instance, each of these elements or entities can include any application, program, library, script, task, service, process or any type and form of executable instructions executing on hardware of a client device (e.g., the nodes 202). The hardware includes circuitry such as one or more processors in one or more embodiments.

Figure 3A:
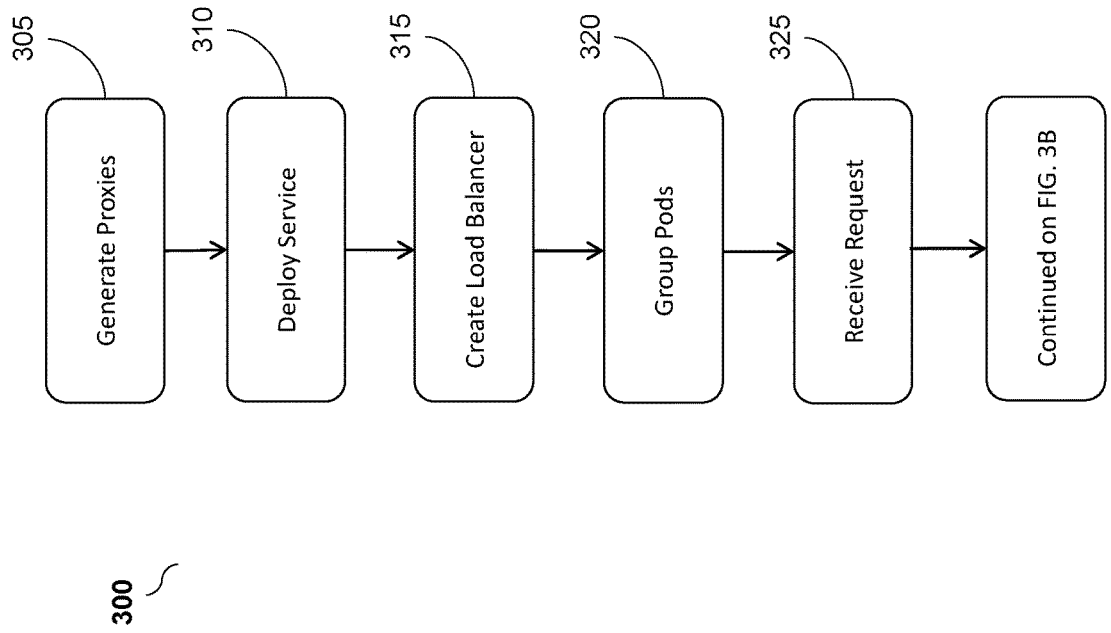
FIGS. 3A-3C are a flow diagram of a method for securing communications between services in a cluster.
Figure 3B:
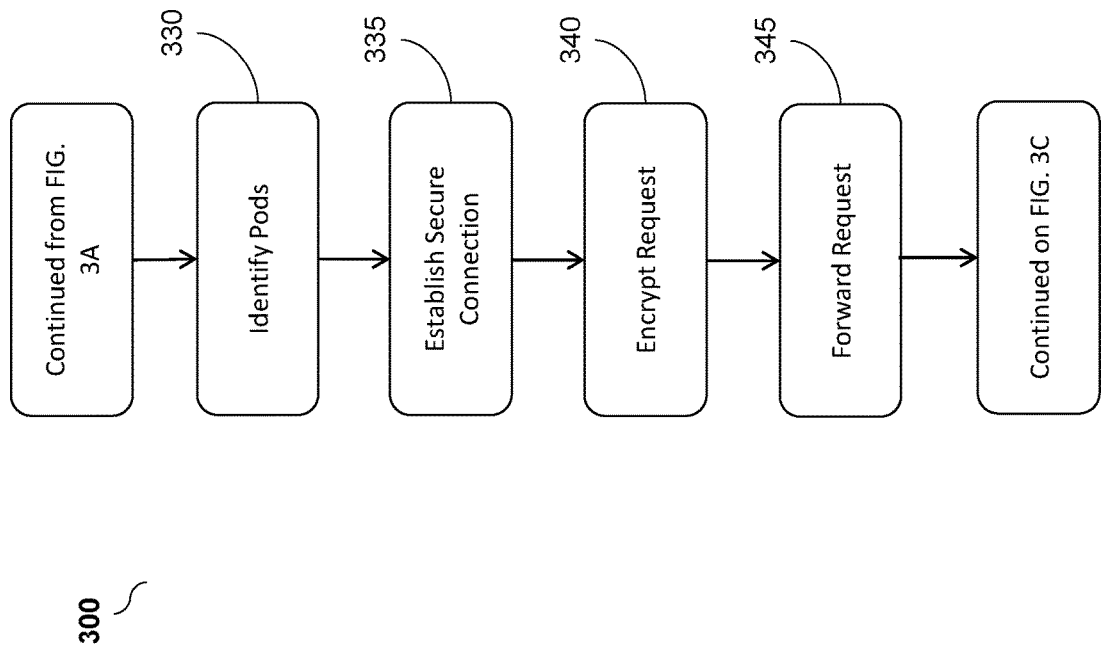
Figure 3C:
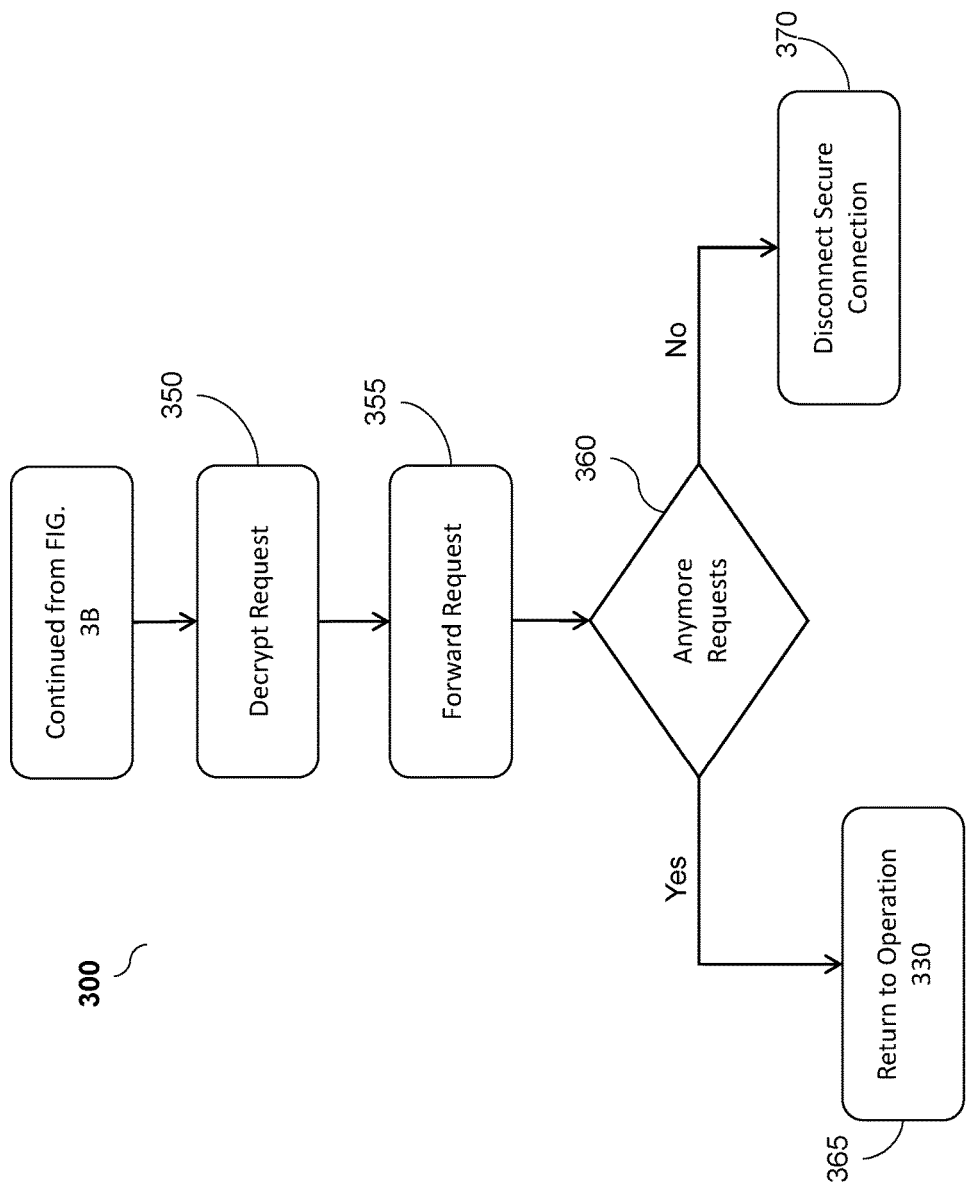

Referring now to FIGS. 3A-3C, depicted is a flow diagram of one embodiment of a method 300 for securing communications between services 206 in a cluster 200. The functionalities of the method 300 may be implemented using, or performed by, the components detailed herein in connection with FIGS. 1-2.

Referring now to operation (305), and in some embodiments, a proxy 204 can be generated. A proxy 204 can be generated for at least one node 202 of a cluster environment 200. In embodiments, at least one proxy 204 can be generated for each node 202 of the cluster of nodes and the at least one proxy 204 can be provided to each node 202 of the cluster of nodes 202. In some embodiments, the cluster environment 200 can include a cluster of nodes 202. A proxy 204 can be generated for each node 202 of the cluster environment 200. The cluster environment 200 can include one or more services 206. Each of the services 206 can include a set of pods 210. The pods 210 can be deployed at or executing on nodes 202 in the cluster environment 200. The proxy 204 can be attached to or deployed at a node 202 to manage and route all traffic (e.g., requests 212) including outbound traffic from the respective node 202 and inbound traffic intended for the respective node 202. In embodiments, the proxy 204 can manage and route outbound traffic generated by one or more pods 210 executing on a local node 202 (e.g., same node 202 the proxy 204 is deployed at) that the proxy 204 is deployed at. In embodiments, the proxy 204 can manage and route inbound traffic intended for one or more pods 210 executing on a local node 202 (e.g., same node 202 the proxy 204 is deployed at) that the proxy 204 is deployed at. The proxy 204 can be attached to or deployed at a node 202 to perform load balancing for outbound traffic from the respective node 202 and inbound traffic intended for the respective node 202.

Referring now to operation (310), and in some embodiments, a service 206 can be deployed. In embodiments, one or more services 206 can be deployed in the cluster 200. The services 206 can deployed with one or more pods 210. The pods 210 can be generated for the respective service 206. In some embodiments, one or more existing pods 210 can be assigned to or associated with the new service 206. In embodiments, the pods 210 associated with the service 206 can be deployed at a common or same node 202. In some embodiments, the pods 210 associated with the service 206 can be deployed two or more different nodes 202.

Referring now to operation (315), and in some embodiments, a load balancer 208 can be generated. In embodiments, a first load balancer 208 can be generated for the first proxy 204 of the first node 202 to perform service level load balancing for outbound traffic from the first node 202 and pod level load balancing for inbound traffic intended for pods 210 executing on the first node 202. A second load balancer 208 can be generated for the second proxy 204 of the second node 202 to perform service level load balancing for outbound traffic from the second node 202 and pod level load balancing for inbound traffic intended for pods executing on the second node 202. A load balancer 208 can be generated and deployed at each proxy 204 of the cluster 200. In some embodiments, a load balancer 208 can be generated for each service 206. For example, each proxy 204 can include a load balancer 208 for each service 206 in the cluster 200. In embodiments, a proxy 204 can include at least one load balancer 208. In some embodiments, a proxy 204 can include two or more load balancers 208, for example, for two or more services 206.

The load balancer 208 can load balance requests 212 for the service 206 the respective load balancer 208 is associated with or created for. For example, the load balancer 208 can, responsive to a request 212 being received, can identify each of the pods 210 forming the service 206 or associated with the servicer 206. The load balancer 208 can select at least one pod 210 from a plurality of pods 210 forming the service 206 or associated with the servicer 206 to receive and/or handle the request 212. In embodiments, the load balancer 208 can execute a load balancing algorithm or scheduling algorithm to perform load balancing, including but not limited to, round robin load balancing, weighted round robin load balancing, least connection load balancing, hierarchical load balancing, random load balancing, service level load balancing, or pod level load balancing. The load balancer 208 can execute a load balancing algorithm or scheduling algorithm to select a pod 210 of a service 206 to receive and/or handle a request 212. A load balancer 208 can perform service level load balancing to balance traffic (e.g., requests 212) between services 206. A load balancer 208 can perform pod level load balancing to balance traffic (e.g., requests 212) between pods 210, for example but not limited to, pods 210 at the same node 202 or different nodes 202. In embodiments, the load balancer 208 can perform load balancing for services 206 and/or requests 212 of protocols, including but not limited to, HTTP, TCP and/or SSL protocol.

Referring now to operation (320), and in some embodiments, pods 210 can be grouped. In embodiments, the first proxy 204 can identify a plurality of pods 210 associated with the service 206 and a node 202 hosting the identified pods 210. The first proxy 204 can group the plurality of pods 210 into multiple groups based on the node 202 hosting the identified pods 210 of the plurality of pods 210. In some embodiments, the first proxy 204 can group, using a load balancer 208, one or more pods 210 associated with the service 206 and executing on the first node 202 into a local group. The local group can be provided as a first backend server with a first protocol for the load balancer 208. The first proxy 204 can group, using the load balancer 208, one or more pods 210 associated with the service 206 and executing on the second node 202 into a remote group. The remote group can be provided as a second backend server with a second protocol for the load balancer 208. The first protocol can be different from the second protocol. For example, the pods 210 can be divided or partitioned into groups based in part on a service 206 the respective pods 210 are associated with. The pods 210 can be divided or partitioned into groups based in part on a node 202 the respective pods 210 are deployed at or executing on. For example, a proxy 204 (e.g., master proxy 204) can divide or partition the pods 210 into a local group and a remote group. The local group can include pods 210 running or executing on a local node 202 that is the same node 202 the respective proxy 204 is executing on). The remote group can include pods 210 running or executing on one or more remote pods 210 that are deployed at a remote node 202 different from the local node 202 the respective proxy 204 is executing on. In embodiments, the local group of pods 210 can be used as or added as a backend server for service level load balancing with a first protocol, including but not limited to HTTP or TCP, for the local node 202. The remote group of pods 210 can be used as or added as a backend server for the load balancing with a second protocol, including but not limited to, SSL protocol, for one or more remote nodes 202.

Referring now to operation (325), and in some embodiments, a request 212 can be received. In embodiments, a first proxy 204 of a first node 202 can receive a request 212 for a service 206 from at least one pod 210 of the first node 202. The service 206 can include a plurality of pods 210 as end points. The plurality of pods 210 can execute in a cluster of nodes 202 including the first node 202. The request 212 can include a service IP address 207 or cluster IP. The request 212 can include a domain name server (DNS) information for the service 206. The pod 210 can generate the request 212 can be for a service 206 that the respective pod 210 that generated the request 212 is not associated with. In some embodiments, the request 212 can include a node IP address included within a node IP range 214 or a node IP range 214. The request 212 can be generated in a first format. For example, the request 212 can be generated unencrypted or not having any encryption. The request 212 can be received at the first proxy 204 of the first node 202 in the first format. For example, a third pod 210c can transmit the request 212 in the first format correspond to an unencrypted format to the first proxy 204 executing on the same local first node 202. The third pod 210c can transmit the request 212 in the first format through a connection 220 to the first proxy 204. The connection 220 can include or correspond to an unencrypted connection 220.

Referring now to operation (330), and in some embodiments, a pod 210 can be identified. In embodiments, the first proxy 204 can select, responsive to a load balancing determination, a pod 210 of a second node 202 of the cluster of nodes 202 to receive the request 212. The selected pod 210 can correspond to at least one end point of the plurality of pods 210 of the service 206. In some embodiments, the first proxy 204 a load balancer 208, can identify each pod 210 associated with the service 206 and one or more nodes 202 hosting the identified pods 210. The first proxy 204, using the load balancer 208, can determine a host node 202 for each pod 210 associated with the service 206.

A load balancer 208 for the requested service 206 and executing on the first proxy 204 can receive the request 212. The load balancer 208 can identify each of the pods 210 associated with the service 206. For example, the load balancer 208 can determine a pod IP address 218 for each of the pods 210 associated with the service 206. The load balancer 208 can determine the nodes 202 hosting the pods 210 associated with the service 206. In embodiments, the load balancer 208 can determine a first pod 210a of the cluster of nodes 202 is associated with the service 206 and executing on the first node 202. The load balancer 208 can determine a fifth pod 210e of the cluster of nodes 202 is associated with the service 206 and executing on the second node 202. The load balancer 208 can determine a sixth pod 210f of the cluster of nodes 202 is associated with the service 206 and executing on the second node 202. Thus, the pods 210 for the service 206 can be executing on different nodes 202.

The load balancer 208 can select between the first, fifth and sixth pods 210a, 210e, 210f using a load balancing algorithm or a scheduling algorithm. In some embodiments, the load balancer 208 can execute the load balancing algorithm or scheduling algorithm to perform load balancing, including but not limited to, round robin load balancing, weighted round robin load balancing, least connection load balancing, hierarchical load balancing, random load balancing, service level load balancing, or pod level load balancing. Responsive to the load balancing determination, the load balancer 208 can select at least one of the first, fifth and sixth pods 210a, 210e, 210f to receive the request 212. In embodiments, the load balancer 208 can use an IP table 230 to identify a pod 210 for the request 212. The IP table 230 can include load or bandwidth for each of the pods 210 associated with the service 206. The load balancer 208 can select at least one of the first, fifth and sixth pods 210a, 210e, 210f to receive the request 212 based in part on a current load or bandwidth for the pod 210. In some embodiments, the load balancer 208 can select the sixth pod 210f executing on the second node 202 to receive and/or handle the request 212.

Referring now to operation (335), and in some embodiments, a secure connection 222 can be established. In embodiments, the first proxy 204 can establish an encrypted connection 222 with a second proxy 204 of the second node 202. The encrypted connection 222 can be established between the first node 202 and the second node 202 through the first proxy 204 and the second proxy 204. The first proxy 204 can determine that the selected pod 210 is executing on the second node 202. The first proxy 204 can identify a proxy IP address 216 of the second proxy 204 of the second node 202. The first proxy 204 can transmit a connection request to the second proxy 204 using the proxy IP address 216 of the second proxy 204. The second proxy 204 can accept the connection request from the first proxy 204. In some embodiments, the second proxy 204 can transmit a connection response indicating acceptance of the connection request. The first proxy 204 can establish the encrypted connection 222 using an encryption code or encryption key. In some embodiments, the first proxy 204 can generate the encryption code or encryption key using an encryption algorithm. For example, the first proxy 204 can generate the encryption code or encryption key using an encryption algorithm for each request 212 received and/or for each encrypted connection 222 to be established. In embodiments, the first proxy 204 can receive the encryption code or encryption key when the respective proxy 204 is generated.

Referring now to operation (340), and in some embodiments, a request 212 can be encrypted. In embodiments, the first proxy 204 can encrypt the request 212 for the service 206. For example, the first proxy 204 can receive a plurality of requests 212 for one or more services 206 from a plurality of pods 210 executing on the first node 202. The requests 212 can be received in a first format (e.g., unencrypted format). The first proxy 204 can modify the plurality of requests 212 from the first format to a second format to encrypt each request 212 of the plurality of requests 212 for transmission through the encrypted connection 222. In embodiments, the second format can include or correspond to an encrypted format or encrypted data. The first proxy 204 can encrypt the request 212 for transmission through the encrypted connection 222 to the second proxy 204. In some embodiments, the proxies 204 executing at the nodes 202 of the cluster 200 can encrypt each request 212 to be transmitted or forwarded through an encrypted connection 222 established between at least two proxies 204. In embodiments, the first proxy 204 can encrypt the request 212 using the same encryption codes and/or encryption techniques as the encrypted connection 222. In some embodiments, the first proxy 204 can encrypt the request 212 using different encryption codes and/or different encryption techniques as the encrypted connection 222. The proxy 204 can encrypt the request 212 using the same encryption code or encryption key the encrypted connection 222 was generated with. In some embodiments, the proxy 204 can encrypt the request 212 using a portion of or a hash of the encryption code or encryption key the encrypted connection 222 was generated with.

In some embodiments, the first proxy 204 can amend or modify the request 212 to include identifier information for the selected pod 210, the node 202 hosting the selected pod 210 and/or for the proxy 204 of the node 202 hosting the selected pod 210. For example, the first proxy 204 can modify a header of the request 212 or metadata of the request 212 to identify the selected pod 210 (e.g., sixth pod 210f) of the second node 202 and a pod IP address 218 of the selected node. In some embodiments, the first proxy 204 can modify a header of the request 212 or metadata of the request 212 to identify the second proxy 204 of the second node 202 and a proxy IP address 216 of the second proxy 204. In embodiments, the first proxy 204 can modify a header of the request 212 or metadata of the request 212 to identify a node IP range 214 of the second node 202 hosting the selected pod 210.

Referring now to operation (345), and in some embodiments, a request 212 can be forwarded. In embodiments, the first proxy 204 can forward the request 212 to the pod 210 of the second node 202 through the second proxy 204. In embodiments, the first proxy 204 can forward the encrypted request 212 to the pod 210 of the second node 202 through the second proxy 204. The first proxy 204 can forward the encrypted request 212 to the selected pod 210 through the encrypted connection 222 and the second proxy 204 executing on the second node 202 can intercept the encrypted request 212. In embodiments, the first proxy 204 can forward the encrypted request 212 to the second proxy 204 executing on the second node 202 through the encrypted connection 222.

The first proxy 204 can transmit or forward traffic generated by pods 210 executing on the local node 202, here first node 202 to route and manage outbound traffic for the first node 202. The first proxy 204 can act or operate as a gateway for the first node 202 to provide secure communications through encrypted connections 222 and encrypted requests 212. The second proxy 204 can intercept or receive traffic, here requests 212 to route and manage inbound traffic intended for one or more pods executing on the second node 202. The second proxy 204 can act or operate as a gateway for the second node 202 to provide secure communications through encrypted connections 222 and encrypted requests 212. Thus, the proxies 204 as described herein can provide secure communications for all inbound traffic and outbound traffic for the nodes 202 of the cluster 200 by establishing encrypted connections 222 between the different proxies 204 and generating and forwarding encrypted requests 212 and/or encrypted traffic.

Referring now to operation (350), and in some embodiments, a request 212 can be decrypted. In embodiments, the encrypted request 212 can be decrypted at the second proxy 204 before being received at the pod 210 of the second node 202. The second proxy 204 can decrypt the encrypted request 212 received from the first proxy 204 to a first format or an original format. The first format or the original format can correspond to the format of the request 212 when the request 212 was received at the first proxy 204. The second proxy 204 can decrypt the request 212 to modify the format of the request 212 from the second format (e.g., encrypted format) to the first format (e.g., unencrypted format).

The second proxy 204 can intercept or receive the encrypted request 212 from the first proxy 204 and decrypt the encrypted request 212. The second proxy 204 can use the same encryption codes the first proxy 204 used to encrypt the request 212 to decrypt the request 212. In some embodiments, each of the proxies 204 can provided a plurality of encryption codes or encryption keys to encrypt and decrypt traffic, including requests 212, when the proxies 204 are established. In some embodiments, the encryption codes or encryption keys can be transmitted between proxies 204 of the cluster 200 responsive to the proxies 204 establishing an encrypted connection 222 between the proxies 204. For example, the first proxy 204 can transmit or forward encryption codes or encryption keys to a second proxy 204 through an encrypted connection 222.

Referring now to operation (355), and in some embodiments, a request 212 can be forwarded. In embodiments, the second proxy 204 can transmit or forward the decrypted request 212 to the selected pod 210 (e.g., sixth pod 210f) of the second node 202. In some embodiments, the second proxy 204 can identify the selected pod 210 based on header data or metadata received with the request 212. For example, the header data or metadata can identify the selected pod 210. In embodiments, the second proxy 204 can use the IP table 230 to identify the selected pod 210. For example, the second proxy 204 can retrieve or extract identifier information from the request 212, such as but not limited to, from the header data or metadata of the request 212. The second proxy 204 can use the identifier information to search and select at least one pod 210, here sixth pod 210f, of a plurality of pods 210 executing on the second node 202 to receive the request 212. The second proxy 204 can use the identifier information to search and select at least one pod 210, here sixth pod 210f, associated with the selected service 206 and executing on the second node 202 to receive the request 212.

Referring now to operation (360), and in some embodiments, a determination can be made if anymore request 212 exist. In embodiments, the first proxy 204 can determine if any more requests 212 for the service 206 have been received or generated by one or more pods 210 executing on the first node 202. Referring now to operation (365), and in some embodiments, the method 300 can return to operation 330. For example, the first proxy 204 can determine that one or more requests 212 for the service 206 need to be forwarded to at least one pod 210. The method 300 can return to operation 330 to identify at least one pod 210 associated with the requested service 206 to receive and/or handle the request. The first proxy 204 can manage and route each subsequent request 212 or all requests 212 to at least one pod 210 associated with the requested service 206. Referring now to operation (370), and in some embodiments, the encrypted connection 222 can be disconnected. For example, the first proxy 204 can determine each of the one or more requests 212 for the service 206 have been forwarded to at least one pod 210. The first proxy can disconnect or end the encrypted connection 222 to the second proxy 204 or any proxy 204 of the cluster 200.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method for securing communications between services in a cluster using load balancing, the method comprising:
    (a) receiving, by a first proxy of a first node of a cluster of nodes, a request from at least one pod of the first node for a service, the service including a plurality of pods executing in the cluster of nodes;
    (b) selecting, by the first proxy responsive to a load balancing determination, a pod of a second node of the cluster of nodes to receive the request;
    (c) establishing, by the first proxy, an encrypted connection between the first proxy and a second proxy of the second node; and
    (d) forwarding, by the first proxy, the request to the selected pod via the encrypted connection to the second proxy, wherein the request is decrypted at the second proxy and forwarded at the pod of the second node.

2. The method of claim 1, comprising:
    generating at least one proxy for each node of the cluster of nodes to perform; and
    providing the at least one proxy to each node of the cluster of nodes.

3. The method of claim 1, comprising:
    generating a first load balancer for the first proxy of the first node to perform service level load balancing for outbound traffic from the first node and pod level load balancing for inbound traffic intended for pods executing on the first proxy; and
    generating a second load balancer for the second proxy of the second node to perform service level load balancing for outbound traffic from the second node and pod level load balancing for inbound traffic intended for pods executing on the second proxy.

4. The method of claim 1, comprising:
    receiving, by the first proxy, a plurality of requests for one or more services from a plurality of pods executing on the first node, the requests received in a first format; and
    modifying, by the first proxy, the plurality of requests from the first format to a second format to encrypt each request of the plurality of requests for transmission through the encrypted connection.

5. The method of claim 1, wherein the request includes an IP address of the service.

6. The method of claim 1, comprising:
    identifying, by the first proxy using a load balancer, each pod associated with the service and a node hosting the identified pods; and
    determining, by the first proxy using the load balancer, a host node for each pod associated with the service.

7. The method of claim 1, comprising decrypting, by the second proxy, the request received from the first proxy to an original format, the original format corresponding to a format of the request when the request was received at the first proxy.

8. The method of claim 1, comprising transmitting, by the second proxy, a decrypted request to the pod of the second node.

9. The method of claim 1, comprising:
    identifying, by the first proxy, a plurality of pods associated with the service and a node hosting the identified pods; and
    grouping, by the first proxy, the plurality of pods into multiple groups based on the node hosting the identified pods of the plurality of pods.

10. The method of claim 1, comprising:
    grouping, by the first proxy using a load balancer, one or more pods associated with the service and executing on the first node into a local group, the local group provided as a first backend server with a first protocol for the load balancer; and
    grouping, by the first proxy using the load balancer, one or more pods associated with the service and executing on the second node into a remote group, the remote group provided as a second backend server with a second protocol for the load balancer, the first protocol different from the second protocol.

11. A system for securing communications between services in a cluster using load balancing, the system comprising:
    a first proxy of a first node comprising one or more processors, coupled to a memory, and the first proxy configured to:
        receive a request from at least one pod of the first node for a service, the service including a plurality of pods executing in a cluster of nodes including the first node;
        select, responsive to a load balancing determination, a pod of a second node of the cluster of nodes to receive the request;
        establish an encrypted connection between the first proxy and a second proxy of the second node; and
        forward the request to the selected pod via the encrypted connection to the second proxy, wherein the request is decrypted at the second proxy and forwarded at the pod of the second node.

12. The system of claim 11, wherein the first proxy is further configured to:
    generate at least one proxy for each node of the cluster of nodes to perform; and
    provide the at least one proxy to each node of the cluster of nodes.

13. The system of claim 11, wherein the first proxy is further configured to:
    generate a first load balancer for the first proxy of the first node to perform service level load balancing for outbound traffic from the first node and pod level load balancing for inbound traffic intended for pods executing on the first proxy; and
    generating a second load balancer for the second proxy of the second node to perform service level load balancing for outbound traffic from the second node and pod level load balancing for inbound traffic intended for pods executing on the second proxy.

14. The system of claim 11, wherein the first proxy is further configured to:
    receive a plurality of requests for one or more services from a plurality of pods executing on the first node, the requests received in a first format; and modify the plurality of requests from the first format to a second format to encrypt each request of the plurality of requests for transmission through the encrypted connection.

15. The system of claim 11, wherein the request includes an IP address of the service.

16. The system of claim 11, wherein the first proxy is further configured to:
identify, using a load balancer, each pod associated with the service and a node hosting the identified pods; and
determine, using the load balancer, a host node for each pod associated with the service.

17. The system of claim 11, wherein the second proxy is further configured to decrypt the request received from the first proxy to an original format, the original format corresponding to a format of the request when the request was received at the first proxy.

18. The system of claim 11, wherein the second proxy is further configured to transmit a decrypted request to the pod of the second node.

19. The system of claim 11, wherein the first proxy is further configured to:
identify a plurality of pods associated with the service and a node hosting the identified pods; and
group the plurality of pods into multiple groups based on the node hosting the identified pods of the plurality of pods.

20. The system of claim 11, wherein the first proxy is further configured to:
group, using a load balancer, one or more pods associated with the service and executing on the first node into a local group, the local group provided as a first backend server with a first protocol for the load balancer; and
group, using the load balancer, one or more pods associated with the service and executing on the second node into a remote group, the remote group provided as a second backend server with a second protocol for the load balancer, the first protocol different from the second protocol.

* * * * *